United States Patent [19]

White

[11] 4,254,404

[45] Mar. 3, 1981

[54] PAGING AND SERVICING SYSTEM

[75] Inventor: David L. White, San Clemente, Calif.

[73] Assignee: Kramor Industries Ltd., Las Vegas, Nev.

[21] Appl. No.: 941,974

[22] Filed: Sep. 13, 1978

[51] Int. Cl.[3] .......................... H04B 7/26; A63B 71/06

[52] U.S. Cl. ............................... 340/311; 273/138 A; 340/286 R; 340/323 R; 455/53; 455/56; 455/95

[58] Field of Search .................. 340/323 R, 311, 312, 340/154, 23, 538, 539, 533, 286 R, 310 R, 310 A, 310 CP, 189 R, 147 T, 180, 152 T, 151; 325/55, 53, 64, 111, 51; 273/138 R, 138 A; 343/6.5 R, 6.5 SS, 6.8 R; 455/53, 31, 56, 49, 95, 100, 140, 205, 227, 36

[56] References Cited

U.S. PATENT DOCUMENTS

| | | | |
|---|---|---|---|
| 1,796,668 | 3/1931 | Sarfaty | 340/286 R |
| 2,722,598 | 11/1955 | McDonald | 325/55 |
| 2,734,131 | 2/1956 | Magnuski | 325/51 |
| 2,955,279 | 10/1960 | Bode et al. | 340/311 |
| 3,155,909 | 11/1964 | Shepherd | 325/51 |
| 3,228,020 | 1/1966 | Gassenheimer et al. | 340/311 |
| 3,272,511 | 9/1966 | Zarich | 340/323 R |
| 3,327,217 | 6/1967 | Stang et al. | 325/55 |
| 3,418,650 | 12/1968 | Rich et al. | 340/311 |
| 3,634,824 | 1/1972 | Zinn et al. | 340/147 R |
| 3,715,726 | 2/1973 | Wallin et al. | 340/311 |
| 3,821,707 | 6/1974 | Peters | 340/286 R |
| 3,836,974 | 9/1974 | Wells | 340/311 |
| 3,976,995 | 8/1976 | Sebestyen | 340/311 |
| 3,984,807 | 10/1976 | Haemmig | 340/23 |
| 4,033,588 | 7/1977 | Watts | 273/138 A |

*Primary Examiner*—James J. Groody

*Attorney, Agent, or Firm*—Lewis B. Sternfels

[57] ABSTRACT

In conjunction with the play of the game of Keno, a combination ticket holder and transmitter-receiver is located at each player's table. Each player's transmitter is coded with a number (e.g., 60,000) of two-tone sequential codes which are transmitted to Keno runners preassigned to specific tables and to a game controller in the Keno lounge. Each player's receiver displays 80 LED digits, numbered 1–80, or other indicatable symbols, and preferably is a super hetradine narrow band receiver to minimize interference from adjacent and co-channel users. Signals are converted from analog to digital when the symbol indicators are connected, and remain displayed until reset for the next game. Each runner has a portable unit with a receiver also which has indicators numbered to identify the players and which preferably also is a super hetradine, dual tone, sequentially coded unit. It converts the tones generated by the player's transmitter into the appropriate display enabling the runner to identify the table requesting assistance. The game controller's console has two receivers. One is identical to that of the player to allow the controller to monitor and verify the game scores. The other receiver is identical to that of the runner and displays all table numbers of all runners. The controller utilizes two transmitters. A first transmitter, identical to that of the player with coding numbering the same quantity of runner boards, enables the controller to request a Keno runner to his location in the same fashion as the player. The second transmitter has encoding compatible to the player's receiver for transmissions of the game scores, game number, status of game or any other required information.

11 Claims, 8 Drawing Figures

PAGING AND SERVICING SYSTEM

BACKGROUND OF THE INVENTION

1. Field of the Invention

The present invention relates to a paging and servicing system for transfer of information among several classes of parties. In particular, the system includes a backup means wherein a party requesting service is assured of being serviced.

2. Description of a Prior Art

While the present invention has devised primarily for use in the play of the game of Keno, it has much broader use in the general art wherein a user may be serviced, such as patients in hospitals, customers in restaurants, and in general paging and answering service systems.

The game of Keno is a game of chance based upon the selection of one number or a combination of numbers by a player in the hopes that randomly selected numbers by the gaming establishment will match his selected numbers, for which payment will be made in accordance with the rules of probability. Specifically, a Keno player who desires to place bets, marks one or more numbers on a ticket and signals an employee to take his bet. Such an employee is called a runner. The runner returns the marked ticket from this and any other players to a cashier, who takes the money and the marked tickets from the runner. A verification mark is stamped on each numbered space marked by the player, as well as with a receipt number and game number. The ticket is returned to the runner who, in turn, returns it to the player. After the game is played, the runner obtains a punched overlay or equivalent showing the winning numbers. These are taken to each of the players, and at the player's table the overlay is compared with his verified ticket to determine his winnings, if any. Any new bets and newly marked tickets are then taken. The winning numbers are selected by a controller who utilizes a random selection process. The selected numbers are displayed on a scoreboard. As indicated, the runner contacts each player three times during the play of the game, which is a requirement by the State Gaming Commission, e.g., Nevada.

This conventional method of servicing players and displaying scores requires that the casino runner be verbally requested or flagged down. Alternatively, the ticket holder at the player's table may include a flashing light to catch the attention of the runner. In both cases, the Keno runner must be informed either by being flagged down or by noticing a flashing light. Each case requires some visual contact between the runner and the player. One problem which arises from this servicing system is that the runner may not see the player and, therefore, not be of service. Such problems arise especially in very active or crowded situations in which there may be many players requesting service, but service may not be provided to all whether by purpose or by inadvertence. This results in disgruntled players as well as lost revenue to the casino.

A further problem relates to the scoring which is presently displayed on a large wall-mounted board. The board has lighted numbers on it which are lit according to the randomly selected numbers. Typically, one scoreboard is mounted in each room; however, the boards are sometimes obstructed or hard to view and, therefore, the players may not be able to follow the play of the selected numbers.

Aside from the particular use for which the present invention was devised, there are many similar types of calling and paging systems. One is a waitresses' call system, such as described in U.S. Pat. No. 3,821,707. There, the call system is activated by a multiplicity of switches, one per customer table. The switches activate a transmitter which transmits a distinctive frequency identifying the appropriate table. A reciever mounted on the waitress's tray is coupled to a plurality of signal lights corresponding to the customers' tables so that a particular table requesting assistance will activate the appropriate light on the waitress's tray. In a manner similar to that described with respect to the Keno game, if a waitress is busy she may not service the requesting customer or the customer may not know that his order is ready.

In a hospital call system, such as shown in U.S. Pat. No. 3,327,217, an automatic remote control call system transmits coded signals to selected remote units to advise nurses of calls which require their attention. Portable receivers carried by nurses allow them to be advised of calls requesting their assistance, even if they are not in the immediate vicinity of the control nurses' call station. A similar problem arises with this system, in that a nurse may be unavailable and, therefore, there is no one to be advised that the patient needs service.

U.S. Pat. No. 1,796,668 shows a restaurant monitoring system of signal lights connected to the seats and menus, allowing the attendant to know precisely the order of each patron at each particular seat. There is an attendant communication signal allowing the patron to request any additional assistance by pressing a key which illuminates to the attendant the seat desiring assistance.

U.S. Pat. No. 2,955,279 discloses a selective paging system using a radio pulse call recognition circuit which provides an audible signal to the person paged. A portable receiver recognizes predetermined coded signals of electrical impulses generated by a radio transmitter at a central location.

U.S. Pat. No. 3,634,824 describes a signaling system of remote transmitters utilizing predetermined tone pulses which provide an information response to an integration signal transmitted by a central station.

U.S. Pat No. 3,715,726 shows a selected tone signaling apparatus using a three-digit call number and encoder values indicative of the desired tone encoding scheme. The call number encoder values are processed through a frequency divider network generating the desired tone appropriate to the user's call number.

U.S. Pat. No. 3,836,974 relates to a digital data transmission and remote control system in which mutual interference by transmitters is eliminated through sequencing thereof. The tone system is compatible with single system area operation or plural system, plural area operation.

SUMMARY OF THE INVENTION

The present invention improves upon or avoids the problems of the prior art, such as exemplified above, by providing for a paging and servicing system for transfer of information among at least three classes of parties. The first class is positioned at a plurality of paging stations having transmitters and receivers thereat. A first signal transmitted therefrom identifies the particular station and is received by a servicing station therefor, which is included within the second of the classes. Receipt of the first signal identifies the particular paging station so that the party of the second class will know that service by the party of the first class is requested. At the same time, a party, as identified as a third of the class, is positioned at a control station and also receives the first signal transmitted by each of the paging stations. It is possible for the party at the control station to call the servicing party to the control station for whatever reason, e.g., for failure to service any of the parties at the paging stations. The party of the control station also transmits information to or for the benefit of the first party at the paging station.

In the preferred embodiment of the present invention, the parties at the paging stations comprise Keno players, the second party at the servicing station is a Keno runner, and the third party at the control station is a controller, whose information transmitted to or for the benefit of the players comprises numbers randomly selected during play of the game of Keno.

It is, therefore, an object of the present invention to provide for a paging and servicing system in which service to a paging party is verified or otherwise assured.

Another object of the paging and servicing system is to provide for remote control of paging and receiving information.

Another object is to provide for such a system in which a third party oversees the servicing afforded to a paging party.

Another object is to provide for transmission of information directly to a paging party.

Another object is to provide for an improved method of calling a Keno runner and having the Keno game's score displayed before the Keno player.

Other aims and objects as well as a more complete understanding of the present invention will appear from the following explanation of an exemplary embodiment and the accompanying drawings thereof.

DESCRIPTION OF THE PREFERRED EMBODIMENT

Figure 1:
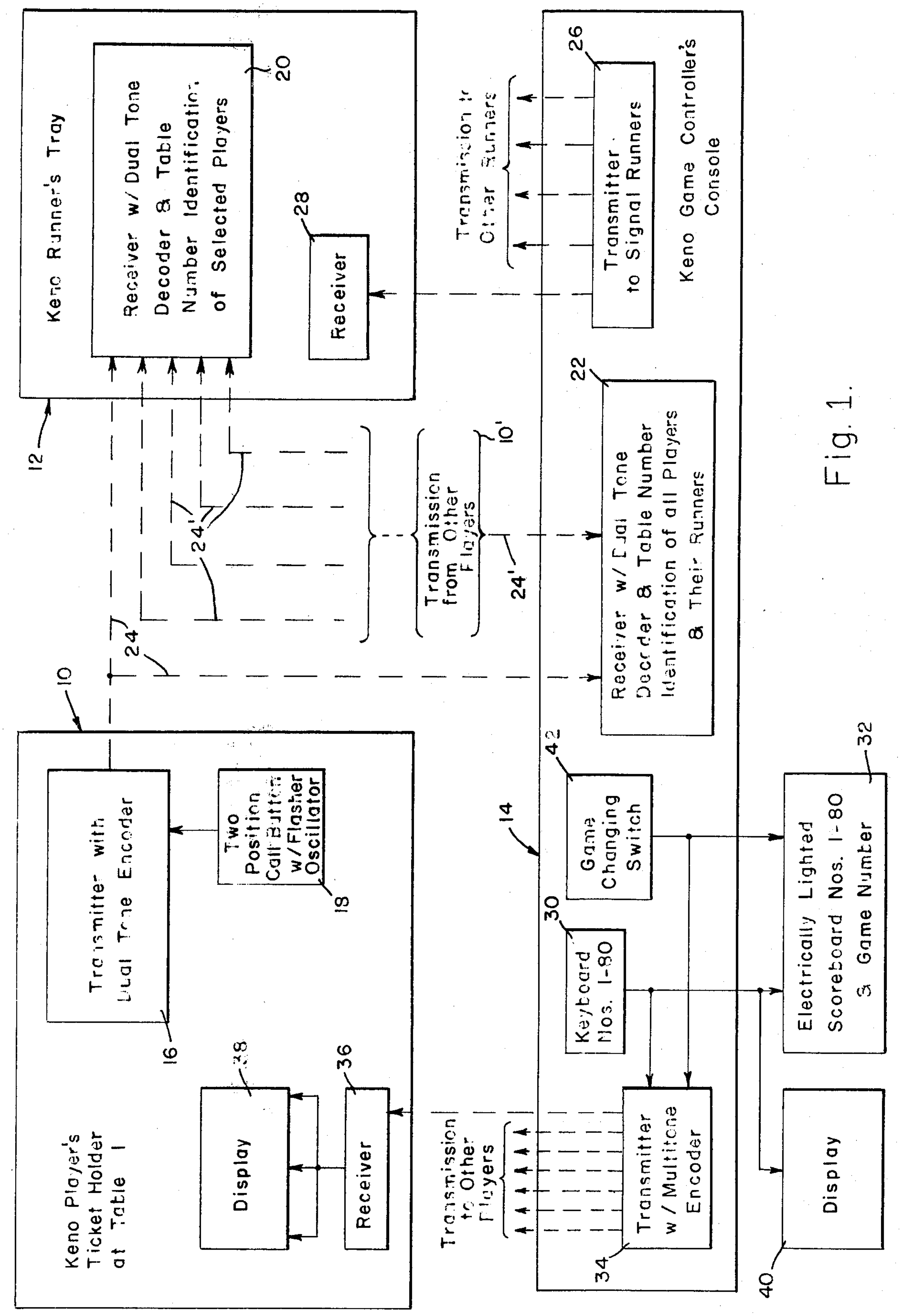
FIG. 1 is a block diagram illustrating the equipment and relationship among the three classes of parties for ensuring that a first party is serviced by a second party and for transmitting information from a third party to the first and second parties.

Referring to FIG. 1, a Keno player's station or table is denoted by indicium 10, a servicing party or Keno runner's tray or station is denoted by indicium 12, and a controller or overseer's station is denoted by indicium 14.

Station 10 includes a transmitter 16 with a dual-tone encoder. A two-position call button with flasher-oscillator 18 is coupled to transmitter 16 to enable it to transmit a signal specifically identifying the transmitter. Transmitter 16 preferably is crystal controlled and preferably with a power output of 100 milliwatts so that it will be below that power rating which requires a license from the Federal Communications Commission. If desired, however, greater power and a citizen band frequency may be utilized.

At runner's station 12 and controller station 14 are receivers 20 and 22, both of which are provided with a dual-tone decoder and table number identification of the selected player, with the controller receiver also providing for identification of all the particular runners. For example, each runner may service twenty-five players, and there may be several runners. Therefore, the controller's receiver will indicate the particular player's and the particular runner's numbers or other identification.

If a player desires assistance of a Keno runner, he activates pushbutton 18 which causes transmitter 16 to transmit a two-tone sequential coded signal which is received and decoded by receivers 20 and 22. Such signals are graphically illustrated by dashed lines 24, with dashed lines 24' representing signals transmitted from other players' stations 10', both to the runner's and controller's stations 12 and 14. At the first push of button 18, the light within button 18 flashes, along with the identification indicia at receivers 20 and 22 to inform all parties that service is requested.

The face of both receivers 20 and 22 incorporate, for example, a display of segmented light emitting diodes (LEDs) numbering from 1 to 120 or any multiple of 12 per row. It is to be understood, however that any other suitable indicating device or devices may be utilized and in any quantity and arrangement as is desired or appropriate for the circumstances or requirements. Since the receivers are activated when a transmitted signal is sent from paging table 10, the appropriate LED or other indicator in the receivers will be activated to alert the runner that a particular table or tables desire assistance. Knowing the preassigned location of the tables, immediate service to the requestor can be provided. When the runner arrives at the table, as discussed above, the runner picks up a marked ticket and the bet. To indicate that this has been accomplished, the runner then pushes button 18 at the player's station so that the oscillating flasher ceases to flash but is extinguished. This change from a flashing signal to an "off" light is also denoted at the display from receiver 22 at the controller's station 14.

In the event that a player is not serviced, the flasher in the two-position call button with flasher/oscillator 18 and its corresponding display at the controller's station will continue to flash. If too great a delay in servicing the play occurs or for whatever other reason, the controller may call the runner to him or her by means of a transmitter 26 which transmits signals to the particular runner, who receives the signals in a receiver 28 located in the tray at his or her station 12. Both transmitter 26 and receiver 28 are similar in respect to transmitter 16 and receiver 20. If desired, receiver 28 may be made a part of receiver 20 with additional LEDs or other indicators to denote, in addition to all table numbers, the call signal from the controller. Upon receipt of such a signal, the runner would proceed to the controller's station for whatever message or information that is required.

After all marked tickets and bets are taken by the runners from their respective customers, they are brought to a cashier who takes the money and tickets from the runners, stamps a verification mark on each numbered space as marked by the players, along with additional marks denoting the receipt number and game number. The tickets are returned to the runner who returns them to the players. After a period of time taking bets, it is determined that a game should begin, and the information is conveyed by a light 29 (see FIG. 2) which lights a "closed" sign, i.e., no more bets may be placed, at which time numbers are randomly selected. After each number is selected, the controller punches a keyboard 30 at or adjacent to his station which causes the corresponding number on an electrically lighted scoreboard 32 to become illuminated. At the same time, depression of a numbered key on keyboard 30 causes a transmitter 34 which has a multi-toned encoder to transmit an appropriate signal to all players which are received at their tables.

As illustrated, table 10 includes a receiver 36 for this purpose which then causes an appropriate LED or other indicator behind or including a number in a display 38 to be energized, in correspondence with the key depressed on the controller's keyboard 30. If desired, the controller may have a similar display 40 at his station as a convenience so that he need not continually view scoreboard 32. Transmitter 34 is identical to transmitter 16 at the player's station 10. Receiver 36 is preferably a super hetradine narrow band receiver which minimizes interference from adjacent and co-channel users. Signals are converted from analog to digital when the LEDs in display 28 are actuated. The LEDs and, therefore, the numbers will remain displayed until reset for the next game.

To this end, a game changing switch 42 is provided at the controller's station and actuation of the switch changes the game number displayed on display 38, as transmitted through transmitter 34 to receiver 36, and on scoreboard 32.

At such time as a game is ended, the runners return to all players' tables to determine whether they have won or not and to pick up any further bets they may wish to make. If a player no longer wishes to make a bet, his light remains unlit and the runner will no longer return to that player's position until the light associated with button 18 is caused to flash by depressing the button.

Figure 2:
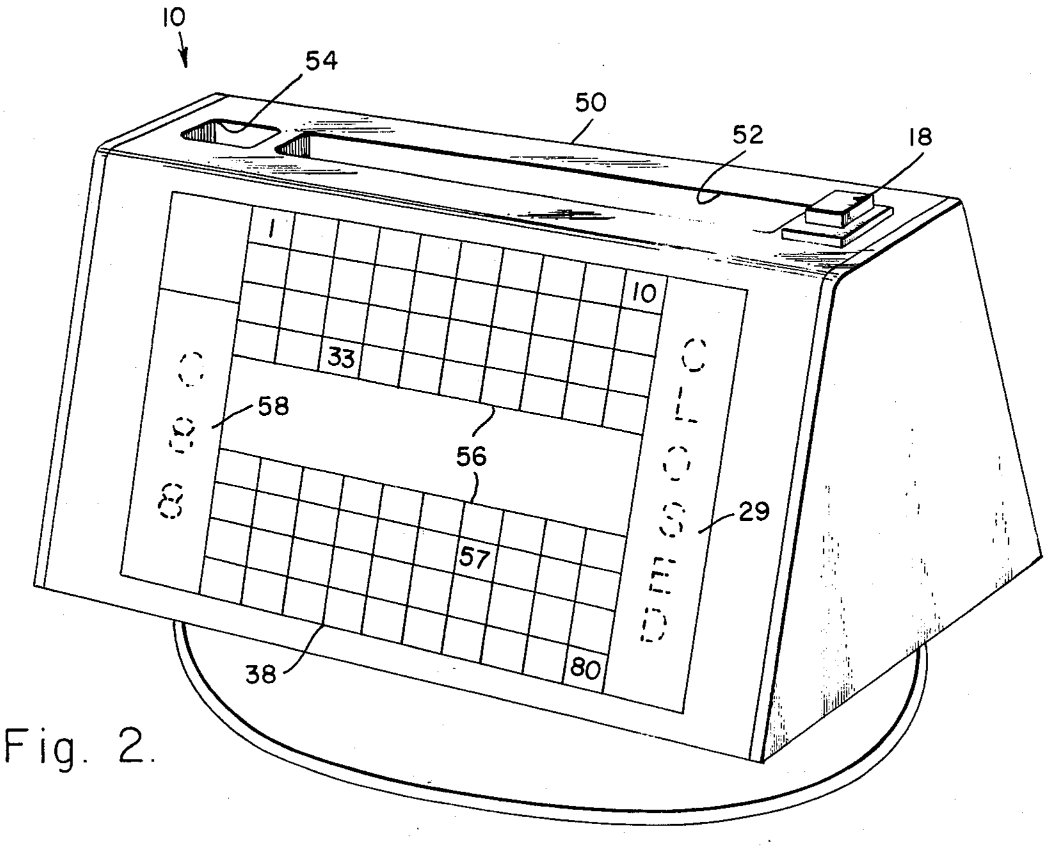
FIG. 2 illustrates a portion of the apparatus at the first party's station for transmitting paging information and for receiving and displaying information received from the third party.
Figure 3:
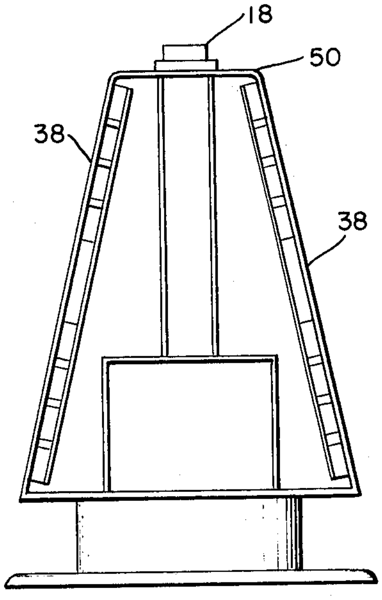
FIG. 3 is a cross-sectional view in elevation of the station depicted in FIG. 2.

As shown in FIGS. 2 and 3, the Keno player's station includes a holder 50 having a slot 52 for tickets to be marked and a smaller slot 54 into which marking crayons, pencils, etc., may be placed. On one or both sides of holder 50 are displays 38, so that, if two players are at a particular table, both may conveniently view what is displayed. On display 38 are eighty squares 56 on which numbers 1–80 are positioned with LEDs, for example, placed behind. Selected LEDs will be illuminated upon receipt in receiver 36 of a signal denoting the particular number depressed on keyboard 30. On one side of display 38 is a position 58 for display of a particular game being played, with the change of number being actuated by game changing switch 42 at the controller's station.

Figure 4:
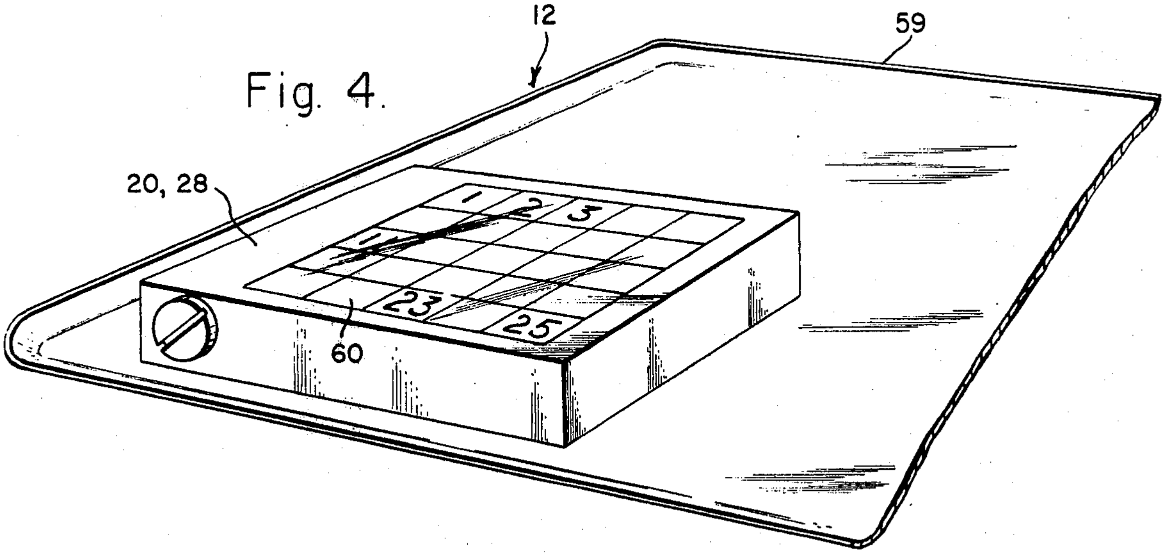
FIG. 4 illustrates the station of the servicing party.

FIG. 4 illustrates the runner's station configured as a tray 59 with a combined receiver 20 and 28 thereon. A display 60 is actuated by signals received from transmitter 16 or 26 in accordance with the number of players being serviced by the runner, with the additional number or letter display denoting transmission from the controller.

Figure 5:
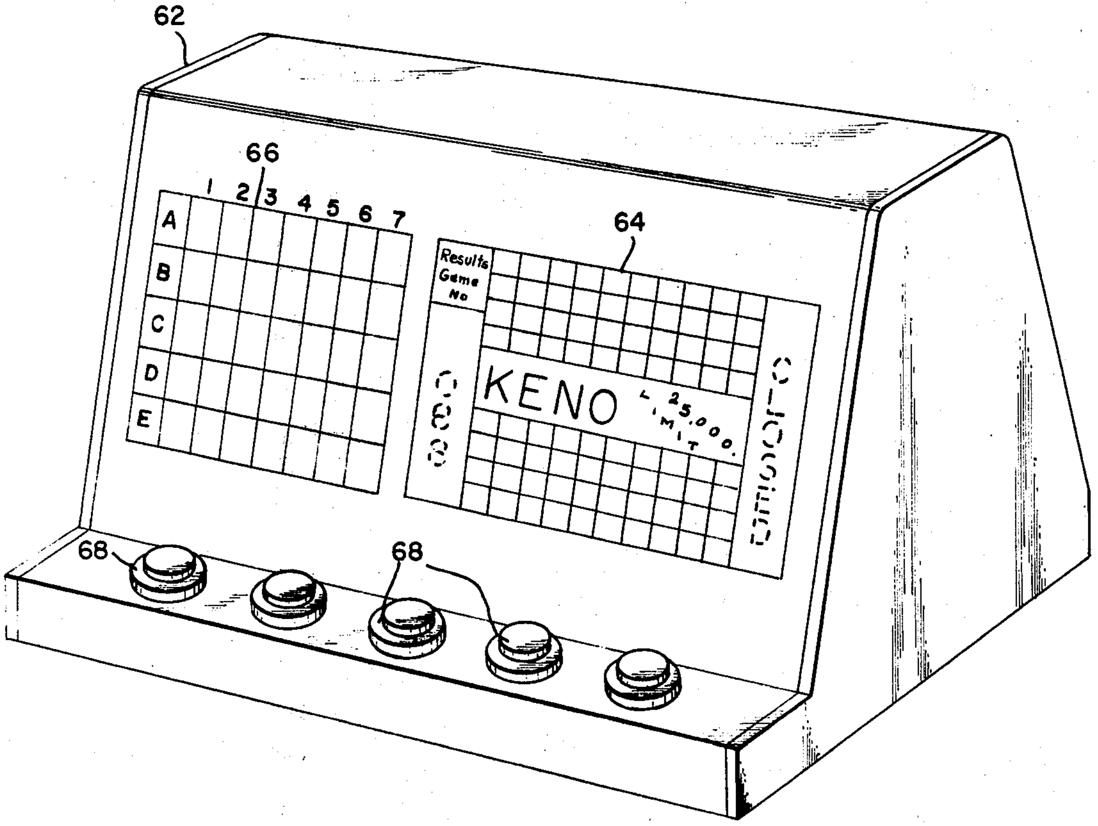
FIG. 5 illustrates a console at the third party's station.

FIG. 5 illustrates a portion of the controller's station comprising a console 62. Console 62 has a display 64 which is similar to display 38 at the player's table, as well as a display 66 which shows the various numbers of the players' tables along with letters, for example, identifying the runners. One or more buttons 68 are used for various purposes, for example, for calling a particular runner by activating transmitter 26.

Figure 6:
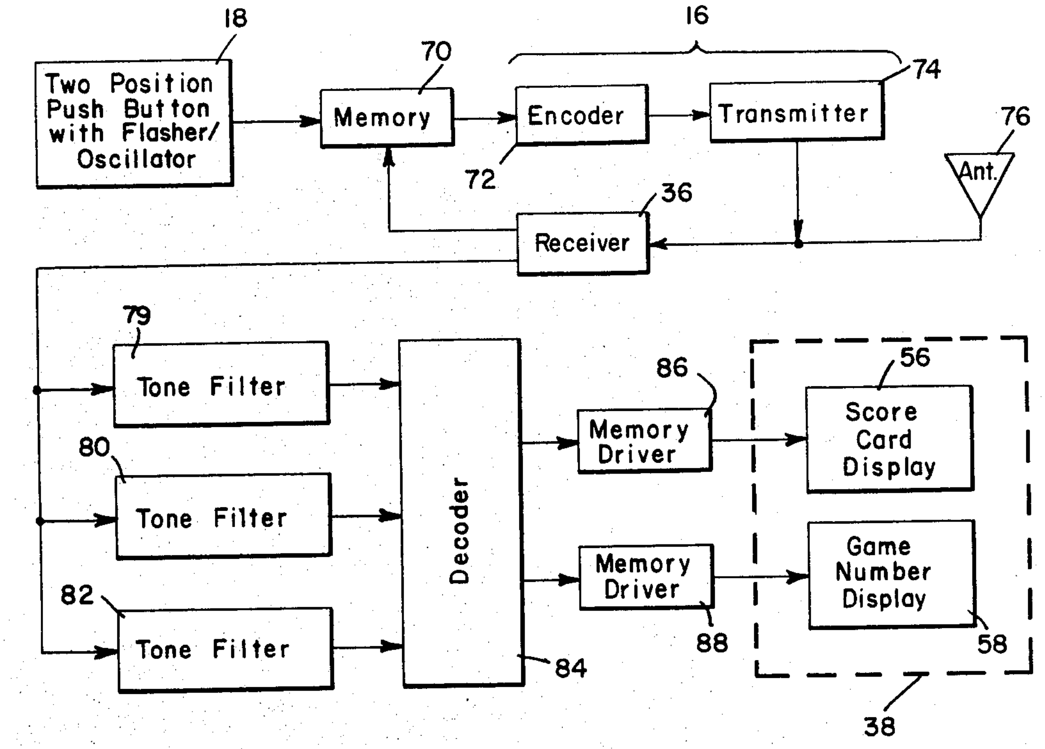
FIG. 6 depicts in block diagram electronic components and flow of information at the first party's station.

Details of the various equipment at the three stations will now be described with respect to FIGS. 6–8. FIG. 6 depicts the equipment at the player's table. As shown in FIG. 6, as also appearing in FIG. 1, is a two-position pushbutton with flasher/oscillator 18. Rather than being directly coupled to transmitters with dual-tone encoder 16, pushbutton 18 may be first coupled to a memory 70 which, in turn, is coupled to an encoder 72 and then to a transmitter 74, the latter two comprising the device designated by indicium 16. Transmitter 74 is then coupled to an antenna 76 which is also coupled to receiver 36, in turn coupled to memory 70. In operation, pushbutton 18 enables table memory 70 to actuate transmitter 74, but only when interrogated in a sequence from the controller station by a controller table interrogator 78 (see FIG. 8). Table interrogation through receiver 36 interrogates memory 70 and, when interrogated, the signal from the memory is encoded by an encoder 72 to identify the particular table. Transmitter 74 thereupon transmits to receivers 20 (FIGS. 1 and 7) on the runner's tray and to the controller's receiver 22 (FIGS. 1 and 8).

Specifically, table memory 70 is an RAM (random access memory), table encoder 72 is a standard dual-tone type encoder, and table transmitter 74 may be crystal controlled with, for example, 100 milliwatts of power output if it is desired to remain within the FCC non-license requirements. Table receiver 36 may be a super hetradine receiver, preferably narrow band to ensure separation between co-channels. It is sequentially dual-tone encoded to exclude interference from transmitters operating out of the same frequency spectrum.

Table receiver 36 also receives signals and tones for the table's scoreboard display 38, specifically in the score card display 56 and the game number display 58. Signals from table receiver 36 are sequentially passed to tone filters 79, 80 and 82 which respectively either reject or accept a frequency. The tone filters are coupled to a decoder 84 which is thereby enabled to invert its binary input to a decimal output whereby memory drivers 86 and 88 coupled thereto can then indicate and store the appropriate number in score card display 56 or game number display 58.

Each tone filter 79, 80 and 82 may be a band pass filter made up of an operational amplifier and a voltage comparator. The decoder may be a standard dual-tone type decoder and the displays, as mentioned before, may be a series of light emitting diodes or other indicating devices placed behind or incorporating printed numerals.

Figure 7:
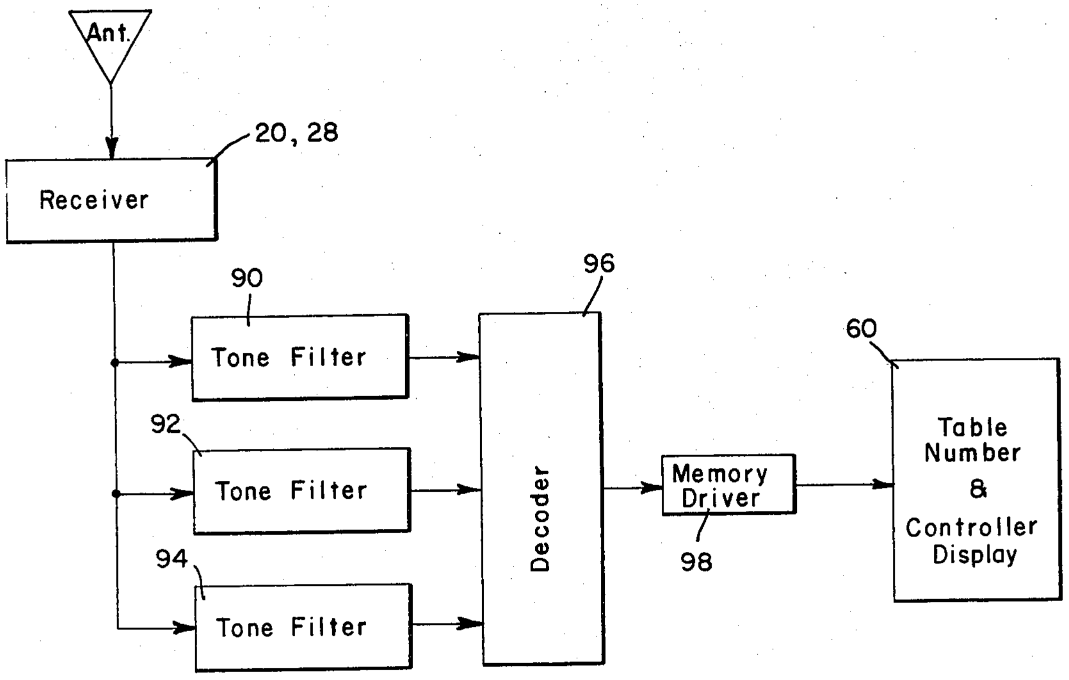
FIG. 7 is a block diagram of the electronic equipment and interconnection thereof at the servicing party's station.
Figure 8:
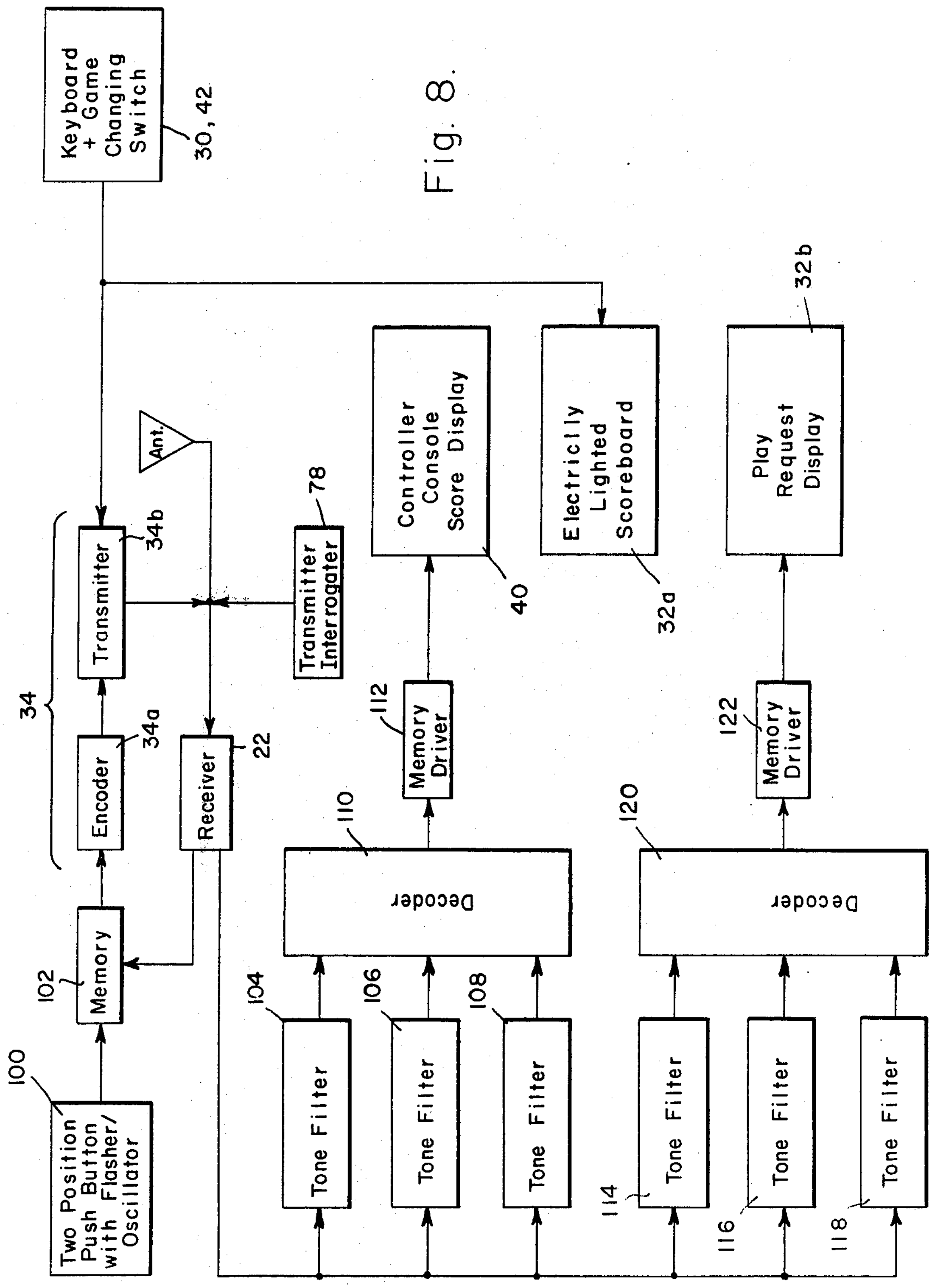
FIG. 8 illustrates in block diagram the electronic equipment and interconnection thereof at the third party controller's station.

The receiver's equipment as shown in FIG. 7 may be similar to that depicted with respect to the player's equipment. Specifically, each receiver or combined receiver 20, 28 is similar to receiver 36, tone filters 90, 92 and 94 are similar to tone filters 79, 80 and 82, decoder 96 is similar to decoder 84, and memory driver 98 is similar to drivers 86 and 88.

In a like manner, the controller's equipment depicted in FIG. 8 may be similar to the equipment shown in FIG. 6 for the player's table. Specifically, two-position pushbutton with flasher/oscillator 100 is similar to the same equipment denoted by indicium 18, memory 102 is similar to memory 70, the same being true of encoder 34*a* and transmitter 34*b* to prior described equipment. Signals received from receiver 22 are transmitted either to tone filters 104, 106, 108 coupled to decoder 110 and driver 112 or to tone filters 114, 116, 118 coupled to decoder 120 and driver 122. Drivers 112 and 122 respectively drive the controller's console for display 40 and a play request display 32*b*.

As stated above, transmitter interrogator 78 causes receiver 36 in the player's table to sequentially interrogate the several memories 70 at the respective players' tables. Specifically, interrogator 78 may be a crystal controlled transmitter which operates continuously with two-tone sequential codes to interrogate, in sequence, each table's memory. For each table memory which is found to be enabled, a signal will be transmitted to the controller's receiver and the runner's receiver. It is optional if the table transmits during each interrogation or is bypassed at subsequent interrogations until reset by pushing button 18 to indicate that a player wishes to play.

Any of the above-described equipment may be battery operated or capable of being operated from conventional electrical outlets (110 or 220 volts). It is preferred, however, that the runner's equipment in particular be portable, battery-operated equipment to facilitate their mobility. In such a case, transmission and reception is wireless.

Although the invention has been described with reference to a particular embodiment thereof, it should be realized that various modifications and changes may be made therein without departing from the spirit and scope of the invention.

What is claimed is:

1. A paging and servicing system for transfer of information among at least three classes of parties comprising:

- a plurality of paging stations, included within a first of the classes, each having a transmitter and a receiver;
- at least one servicing station, included within a second of the classes, for said paging stations and having receiver means for receiving first signals transmitted from said paging stations; and
- a control station, included within a third of the classes, for said paging and servicing stations and having a receiver for receiving the first signals transmitted from said paging stations and a transmitter for transmitting second signals directly to said receivers at said paging stations and at least periodically to said receiver means at said servicing station.

2. The system as defined in claim 1 wherein said paging station transmitters have means for differently encoding the first signals respectively for identifying each of said paging stations, and said paging stations having a plurality of manually-actuable controls coupled respectively to said paging station transmitters which thereby transmit the first signals to said servicing and control stations for identifying said paging stations.

3. The system as defined in claim 2 further including displays coupled respectively to each of said paging station receivers and to said control station, and wherein said control station includes manually-actuable controls coupled to said displays at least in part through said control station transmitter for encoding the second signals and for enabling information contained in the second signals to be displayed at said control station and at said respective paging stations.

4. A paging and servicing system for transfer of information among at least three classes of parties comprising:

- a plurality of paging stations, included within a first of the classes, each having a transmitter and a receiver, said paging stations having a plurality of manually-actuable controls coupled respectively to said paging station transmitters which thereby transmit first signals, and having means for differently encoding the first signals respectively for identifying each of said paging stations;
- one or more servicing stations, included within a second of the classes, for said paging stations, and each having a receiver for receiving the first signals transmitted from said paging stations;
- a control station, included within a third of the classes, for said paging and servicing stations and having a receiver for receiving the first signals transmitted from said paging stations, and a transmitter including first means for transmitting second signals to said receivers at said paging stations and second means with manually-actuable controls coupled thereto for transmitting third signals to each said servicing station receiver for paging one or more of the second class of parties; and
- displays coupled respectively to each of said paging station receivers and to said control station, and wherein said control station includes manually-actuable controls coupled to said displays at least in part through said control station transmitter which is thereby encoded with the second signals and which is thereby enabled to have information contained in the second signals to be displayed at said control station and at said respective paging stations.

5. The system as defined in claim 4, useful in a play of a sequence of events, wherein said control station further includes a switching device coupled to said displays, at least in part through said control station transmitter, for changing the sequence.

6. The system as defined in claim 5 wherein said receivers and transmitters are crystal-controlled with 100 milliwatts of power, said transmitters are coded with 60,000 two-tone sequential codes which are received and decoded simultaneously by said receivers, and said receivers are super hetradine, dual tone, sequentially coded narrow band receivers for minimizing interference from adjacent and co-channel transmitters.

7. The system as defined in claim 6 wherein each of the events comprises a Keno game, wherein said displays each comprise a number of digits, and wherein said control station manually-actuable controls comprise a keyboard having an equal number of digits.

8. The system as defined in claim 4 wherein said first of said classes comprises groups of Keno players each being placed respectively at said paging stations, said second of said classes comprises one or more Keno runners in which one Keno runner per one of said servicing stations is responsible for each of said groups of Keno players, and said thrid of said classes comprises a controller for all of said groups of Keno players and said Keno runners.

9. The system as defined in claim 8 wherein each of said paging station manually-actuable controls defines a flasher and oscillator switching device respectively coupled to said paging station transmitters and including a light and means for causing flashing of said light upon a first actuation of said switching device, and for causing extinction of said light upon a second actuation of said switching device.

10. A method for transferring information among at least three classes of parties, comprising the steps of:

transmitting signals from a first of the classes to the second and third of the classes; and transmitting signals from the third of the classes to the first of the classes and at least periodically to the second of the classes in response to the signals received from the first of the classes.

11. A paging and servicing system for transfer of information among at least three classes of parties comprising:

a plurality of paging stations, included within a first of the classes, each having transmitters and receivers;

at least one servicing station, included within a second of the classes, for said paging stations and having receiver means for receiving first signals transmitted from said paging stations; and a control station, included within a third of the classes, for said paging and servicing stations and having a receiver for receiving the first signals transmitted from said paging stations, and a transmitter having means for transmitting second signals to said receivers at said paging stations, and further means for transmitting third signals to said servicing station receiver means for paging a party of the second class.

* * * * *